United States Patent Office 2,851,476
Patented Sept. 9, 1958

2,851,476
PROCESS OF MAKING PHOSPHATES

Ingenuin Hechenbleikner, Clarksburg, Mass., assignor to Shea Chemical Corporation, Jeffersonville, Ind., and Columbia, Tenn., a corporation of Tennessee No Drawing. Application July 5, 1956
Serial No. 595,816

10 Claims. (Cl. 260—461)

This invention relates to the preparation of trialkenyl and tri-2-haloalkenyl phosphates.

It is an object of the present invention to prepare trialkenyl and tri-2-haloalkenyl phosphates by a simpler and more efficient process.

Another object is to prepare triallyl phosphate in outstanding yields from triallyl phosphite.

Triallyl phosphate is a valuable intermediate in the flame proofing field. However, at present there is no satisfactory method for preparing this compound cheaply in good yields.

There are numerous methods of preparing trialkyl or triaryl phosphates. However, most of these methods have proven to be unsatisfactory in the preparation of the alkenyl or 2-haloalkenyl phosphates due to the excessive formation of by-products.

It has now been found that trialkenyl phosphates and tri-2-haloalkenyl phosphates can be obtained in excellent yields by oxidizing the corresponding trialkenyl or tri-2-haloalkenyl phosphite with hydrogen peroxide under alkaline conditions. It is indeed surprising that this reaction can be carried out successfully in view of the well known propensity of alkenyl compounds such as triallyl phosphite and triallyl phosphate to polymerize and also in view of the known tendency of alkenyl compounds to form epoxy rings when treated with peroxides.

Typical examples of suitable trialkenyl and tri-2-haloalkenyl phosphite starting materials are triallyl phosphite, trimethallyl phosphite, tri-2-chloroallyl phosphite, tri-2-bromoallyl phosphite and tri-2-fluoroallyl phosphite. The products obtained are trialkenyl and tri-2-haloalkenyl phosphates such as triallyl phosphate, trimethallyl phosphate, tri-2-chloroallyl phosphate, tri-2-bromoallyl phosphate and tri-2-fluoroallyl phosphate.

It is possible to use mixed alkenyl phosphites such as diallyl monomethallyl phosphite, for example, to form the corresponding diallyl monomethallyl phosphite.

Less preferably, it is possible to form an alkenyl or 2-haloalkenyl phosphate by oxidation of an alkenyl or 2-haloalkenyl phosphite having only one or two alkenyl groups, e. g., phenyl diallyl phosphite can be oxidized to phenyl diallyl phosphate and diphenyl allyl phosphite can be oxidized to diphenyl allyl phosphate. As starting materials, there can be employed mono or dialkenyl or 2-haloalkenyl phosphites wherein the remaining ester group or groups are of an aryl nature such as the phenyl group, the o-tolyl group, m-tolyl group or p-tolyl group, e. g., o-tolyl diallyl phosphite, monophenyl di-2-chlorallyl phosphite, diphenyl mono-2-chloroallyl phosphite, or an aiphatic group, e. g., methyl or butyl, e. g., methyl diallyl phosphite, methyl di-2-chloroallyl phosphite, dibutyl allyl phosphite, dibutyl mono-2-chloroallyl phosphite, octyl diallyl phosphite, etc.

The mixed phosphite esters of the alkenyl or 2-haloalkenyl alcohol with each other or with the alkanol or phenol can be formed by transesterification of triphenyl phosphite with the appropriate mixture of alcohols or alcohol and phenol utilizing the alcohols or alcohol and phenol in the mol ratio desired in the phosphite ester.

In general, the phosphite esters which are oxidized to the corresponding phosphate should have at least one ethylenically unsaturated double bond. Thus, there can be used monoaryl dialkenyl phosphites, monoaryl di-2-haloalkenyl phosphites, diaryl monoalkenyl phosphites, diaryl mono-2-haloalkenyl phosphites, monoalkyl dialkenyl phosphites, monoalkyl di-2-haloalkenyl phosphites, dialkyl monoalkenyl phosphites and dialkyl mono-2-haloalkenyl phosphites.

The reaction is carried out under alkaline conditions, usually at a pH of 8 or above and preferably at a pH of 11 or above. The preferred alkaline material is sodium hydroxide, although other alkaline materials, such as potassium hydroxide, sodium carbonate, calcium hydroxide and other inorganic bases, as well as organic bases including the quaternary ammonium hydroxides, e. g., triethyl ammonium hydroxide, can be used.

While hydrogen peroxide is the preferred catalyst, other materials which form it in situ can be used, such as sodium peroxide, for example. The reaction is preferably carried out in aqueous suspension, although inert organic solvents can be used, such as acetone or 95% ethyl alcohol, for example. The temperature of reaction is not particularly critical and temperatures from 0° C. to 60° C. have been found to be preferred. Room temperature is conveniently employed. The products are obtained in yields of as much as 96 to 99%.

For best yields equal molar amounts of the phosphite and hydrogen peroxide are employed. Either reactant can be employed in excess, e. g., an excess of 50% of hydrogen peroxide or of triallyl phosphite can be employed, but the yields will necessarily be reduced.

Generally, when reacting one mol of the alkenyl or haloalkenyl phosphite, e. g., triallyl phosphite, with the hydrogen peroxide, the phosphite is suspended in 100 to 500 ml. of water, or other solvent, containing 1 to 10% of the alkaline catalyst and there is added one mol of the hydrogen peroxide as a 10 to 50% solution in water.

In the specification and claims all parts and percentages are by weight.

Example 1

1 mol of triallyl phosphite was suspended in 250 ml. of water containing 1% of sodium hydroxide and to the stirred solution at room temperature was added gradually 1 mol of hydrogen peroxide as a 30% solution. Heat was liberated and the reaction was controlled by adequate cooling so that the temperature did not go above about 60° C. When addition of the hydrogen peroxide was completed, the aqueous layer was separated from the organic layer, and the latter dried and then distilled. The triallyl phosphate so produced was water white and distilled at 85–90° C./1 mm. The yield of distilled ester was 99%.

Example 2

Example 1 was repeated using trimethallyl phosphite in place of triallyl phosphite to form trimethallyl phosphate.

Example 3

Example 1 was repeated using tri-2-chloroallyl phosphite in place of triallyl phosphite to form tri-2-chloroallyl phosphite.

Example 4

1 mol of triallyl phosphite was suspended in 300 ml. of water containing 5 grams of sodium carbonate and 1 mol of 35% hydrogen peroxide were added at 25–30° C. with stirring and cooling to maintain the temperature at this level. The aqueous layer was separated from the organic layer and the latter dried and distilled to obtain triallyl phosphite distilling at 85–90° C./1 mm. in a yield of 96%.

*Example 5*

Similar results to those in Example 4 are obtained if 1 mol of triallyl phosphite is suspended in 500 ml. of water containing 10% sodium carbonate and there is added 1 mol of 50% hydrogen peroxide at 10° C.

I claim:

1. A process of preparing a triester of phosphoric acid having one to three ethylenically unsaturated double bonds, not more than one such double bond being present in each esterifying group, any esterifying group containing such double bond having three to four carbon atoms comprising oxidizing a triester of phosphorous acid having one to three ethylenically unsaturated double bonds, not more than one such double bond being present in each esterifying group, any esterifying group containing such double bond having three to four carbon atoms with alkaline hydrogen peroxide in the presence of a solvent.

2. A process of preparing a trialkenyl phosphate comprising oxidizing a phosphite from the group consisting of trialkenyl and tri-2-haloalkenyl phosphites wherein the alkenyl groups and the haloalkenyl groups each contains 3 to 4 carbon atoms with alkaline hydrogen peroxide in the presence of a solvent.

3. A process according to claim 2 wherein there is employed aqueous hydrogen peroxide at a pH of at least about 8.

4. A process of preparing triallyl phosphate comprising oxidizing triallyl phosphite with aqueous alkaline hydrogen peroxide.

5. A process of preparing trimethallyl phosphate comprising oxidizing trimethallyl phosphite with aqueous alkaline hydrogen peroxide.

6. A process of preparing tri-2-chloroallyl phosphate comprising oxidizing tri-2-chloroallyl phosphite with aqueous alkaline hydrogen peroxide.

7. A process of preparing triallyl phosphate comprising oxidizing triallyl phosphite with aqueous hydrogen peroxide at a pH of at least 8.

8. A process of preparing a trialkenyl phosphate selected from the group consisting of triallyl phosphate, trimethallyl phosphate, tri-2-chloroallyl phosphate, tri-2-bromoallyl phosphate and tri-2-fluoroallyl phosphate comprising oxidizing a phosphite from the group consisting of triallyl phosphite, trimethallyl phosphite, tri-2-chloroallyl phosphite, tri-2-bromoallyl phosphite and tri-2-fluoroallyl phosphite with aqueous alkaline hydrogen peroxide.

9. A process according to claim 8 wherein there is employed aqueous hydrogen peroxide at a pH of at least about 8.

10. A process according to claim 8 wherein there is employed aqueous hydrogen peroxide at a pH of at least about 11.

References Cited in the file of this patent

UNITED STATES PATENTS

| | | |
|---|---|---|
| 2,059,084 | Buchheim | Oct. 27, 1936 |

FOREIGN PATENTS

| | | |
|---|---|---|
| 872,040 | Germany | Mar. 30, 1953 |
| 926,842 | Germany | Apr. 25, 1955 |
| 758,362 | France | Jan. 15, 1934 |
| 164,197 | Switzerland | Dec. 1, 1933 |